United States Patent
Lautenschlager

(10) Patent No.: US 6,571,100 B1
(45) Date of Patent: May 27, 2003

(54) METHOD OF PROVIDING A PERSONAL COMMUNICATIONS SERVICE, CALL ROUTING METHOD, AND SERVICE CONTROL POINT

(75) Inventor: Wolfgang Lautenschlager, Weissach-Flacht (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/493,089

(22) Filed: Jan. 28, 2000

(30) Foreign Application Priority Data

Feb. 5, 1999 (EP) .......................................... 99 440 021

(51) Int. Cl.[7] ................................................ H04Q 7/20
(52) U.S. Cl. .................................. 455/445; 379/220.01
(58) Field of Search ................................. 455/445, 432, 455/433, 435, 444, 452, 458, 459, 464, 560; 379/212, 211.01, 221.01, 220.01, 221.14, 211.02, 212.01

(56) References Cited

U.S. PATENT DOCUMENTS

| | | | |
|---|---|---|---|
| 5,371,781 A | * 12/1994 | Ardon | 455/445 |
| 5,454,032 A | 9/1995 | Pinard et al. | |
| 5,724,409 A | * 3/1998 | Malik et al. | 379/32.02 |
| 5,901,359 A | 5/1999 | Malmstrom | |
| 5,920,815 A | * 7/1999 | Akhavan | 455/426 |
| 6,188,758 B1 | * 2/2001 | Christensen et al. | 379/211.02 |
| 6,404,879 B1 | * 6/2002 | Melen et al. | 379/221.09 |
| 6,449,483 B1 | * 9/2002 | Akhteruzzaman et al. | 455/445 |

FOREIGN PATENT DOCUMENTS

| | | |
|---|---|---|
| EP | 526 764 A2 | 2/1993 |
| EP | 0 738 093 A2 | 10/1996 |
| EP | 0 851 702 A2 | 7/1998 |
| WO | WO 95/12268 | 5/1995 |
| WO | WO 98/57515 | 12/1998 |

* cited by examiner

*Primary Examiner*—Nay Maung
*Assistant Examiner*—Jean A Gelin
(74) *Attorney, Agent, or Firm*—Sughrue Mion, PLLC

(57) ABSTRACT

The invention relates to a method of providing a personal communications service to subscribers (A) having at least one fixed terminal (TE2) and at least one mobile terminal (MTE1, MTE2) registered in a communications network (KOM) consisting of two or more fixed networks (FN1) and mobile radio networks (MN1, MN2), to a method of routing calls directed to such subscribers, and to a service control point (SCP) for carrying out these methods. The service control point (SCP) is triggered by a service switching point (SSP1) by means of a service request message when the service switching point detects a call directed to such a subscriber. When being triggered for a call directed to a particular subscriber (A), the service control point (SCP) requests status data about the at least one mobile terminal (MTE1, MTE2) associated with the particular subscriber (A) from the respective mobile radio network (MN1, MN2) in which the at least one mobile terminal associated with the subscriber (A) is registered. Based on the requested status data, the SCP then selects that terminal of the subscriber (A) to which the call for which the (SCP) has been triggered is to be routed.

10 Claims, 3 Drawing Sheets

METHOD OF PROVIDING A PERSONAL COMMUNICATIONS SERVICE, CALL ROUTING METHOD, AND SERVICE CONTROL POINT

BACKGROUND OF THE INVENTION

This invention relates to a method of providing a personal communications service to subscribers having at least one fixed terminal and at least one mobile terminal registered in a communications network consisting of two or more fixed networks and mobile radio networks, to a call routing method, and to a service control point.

The invention starts from a communications system as is disclosed in EP 0738093. In this communications system, a subscriber is reachable at a single number even though he has several different communications terminals, such as ISDN, GSM, or DECT terminals, at which he may be reached.

A connection request directed to the subscriber is routed to a central network node of the communications system. This node translates the subscriber's personal number into the physical number of the terminal under which the subscriber is registered. The connection is then established to the terminal under which the subscriber is registered.

The registration is done manually by explicitly sending a control message from the subscriber to the central node or automatically through a DECT access system (DECT= Digital European Cordless Telephone) of the fixed network in whose radio coverage area the subscriber is moving with his DECT terminal. The base station of the DECT access system determines the entry of the DECT terminal into its radio coverage area and sends a registration message to the central node.

SUMMARY OF THE INVENTION

It is the object of the invention to increase the flexibility of the call routing provided by such a personal communications service.

This object is attained by a method of providing a personal communications service according to the teaching of claim 1, by a call routing method according to the teaching of claim 9, and by a service control point according to the teaching of claim 10.

The idea underlying the invention is that a service control point, when triggered by a call to a subscriber with several terminals, automatically requests, via signaling messages, status data of the mobile terminals of this subscriber from the mobile radio networks with which these mobile terminals are associated. Based on these status data, the service control point then decides which of the subscriber's terminals the call should be routed to.

One advantage of the invention is increased user-friendliness. Call forwarding is no longer fixed by explicit registrations but can respond dynamically based on a large number of data reflecting the current situation. This makes it possible to dispense with explicit registration procedures by the subscriber.

Through the large number of data that can be made available by the method according to the invention and provide an image of the current situation, and by means of personal user profiles, the call forwarding can be very closely adapted to the needs of the subscribers.

Another advantage of the invention is that only a novel service control point is necessary to carry out the method, and that otherwise the invention requires no changes whatsoever to components of existing fixed networks and mobile radio networks. Furthermore, the invention requires no novel terminals but can be implemented with all existing signals, so that it can be integrated into existing communications systems quickly and at low cost.

Further advantageous features of the invention are defined in the subclaims.

BRIEF DESCRIPTION OF THE DRAWINGS

The invention will become more apparent by reference to the following description of several embodiments taken in conjunction with the accompanying drawings, in which.

DETAILED DESCRIPTION OF THE INVENTION

Figure 1:
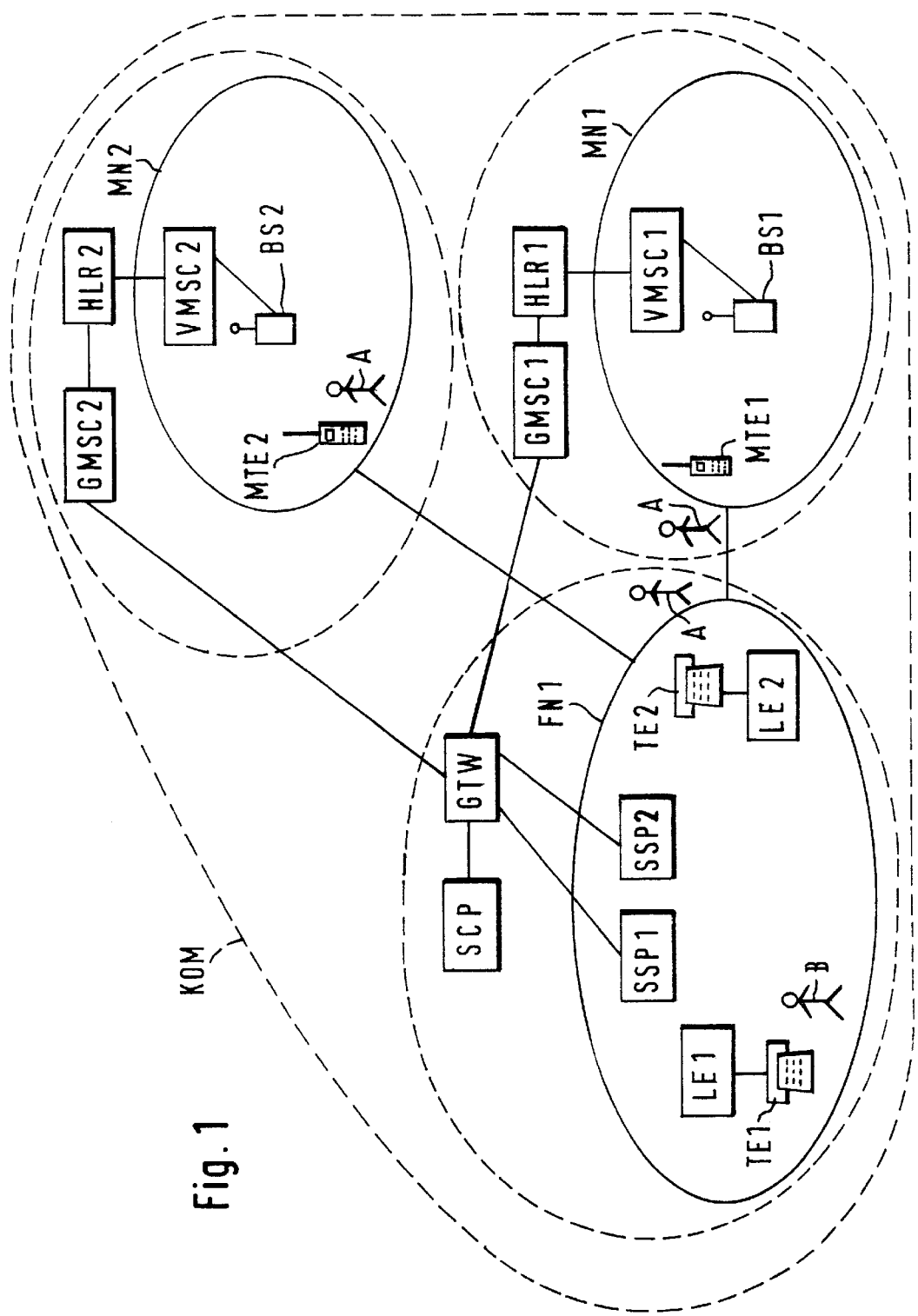
FIG. 1 is a block diagram of a communications network with a service control point in accordance with the invention.

FIG. 1 shows a communications network KOM with three interconnected subnetworks FN1, MN1, and MN2.

The subnetwork FN1 represents a fixed network for voice communication between terminals, such as an Integrated Services Digital Network (ISDN). Besides voice communication, of course, video and data communication may be possible over the subnetwork FN1. The subnetwork FN1 may include exchanges according to, e.g., the DECT standard which permit cordless terminals to be connected to the subnetwork FN1.

Besides the subnetwork FN1, the communications network KOM may include further fixed networks, which are assigned to different network operators, for examples.

The subnetworks MN1 and MN2 represent mobile radio networks based on the GSM standard (GSM=Global System for Mobile Communications). The subnetworks may also conform to different technical standards; for example, the subnetwork MN1 may be a satellite communications system, and the subnetwork MN2 a GSM system. It is also possible that the communications network KOM contains only the network MN1, i.e., only one mobile radio network, or has further mobile radio networks in addition to the subnetworks MN1 and MN2.

The subnetwork FN1 comprises a number of interconnected exchanges, of which four exchanges LE1, LE2, SSP1, and SSP2 are shown in FIG. 1 by way of example. Furthermore, the communications network includes a signaling node GTW and a service control point SCP, which are connected to the exchanges SSP1 and SSP2 via a signaling network, such as the ITU-T Signaling System No. 7.

The exchanges LE1 and LE2 are subscriber terminal exchanges. Of the terminals connected to the exchanges LE1 and LE2, one terminal TE1, TE2 is shown for each exchange by way of example. The terminals TE1 and TE2 are fixed terminals, for example ISDN terminals. The terminal TE1 is associated with a subscriber B, and the terminal TE2 is associated with a subscriber A.

The exchanges SSP1 and SSP2 represent service switching points. On the occurrence of a trigger event, e.g., that a particular destination number is contained in the call being switched through by the service switching point, the service switching points send a service request message with a corresponding service indicator over the signaling network to the service control point SCP. At the service control point SCP, a service logic associated with the service indicator is then activated, which provides a service for the call. During the provision of the service, the service control point controls the further handling of the call by the service switching points SSP1 and SSP2 by means of control messages. It is also possible that the service control point SCP does not represent a unit remote from a service switching point but is formed by a program module running on a computer platform of a service switching point.

Furthermore, each of the exchanges LE1 and LE2 may also perform both the function of a subscriber terminal exchange and that of a service switching point.

The signaling node GTW provides the gateway from the signaling network of the subnetwork FN1 to the signaling networks of the subnetworks MN1 and MN2, i.e., network interworking functions. Examples of such network interworking functions are: supervisory and filter functions (screening) adaptation of addressing (global title translation). The signaling node GTW could also be dispensed with.

The subnetworks MN1 and MN2 each comprise a plurality of mobile switching centers (MSC) and base stations (BS) connected thereto, of which four mobile switching centers GMSC1, VMSC1 and GMSC2, VMSC2 and two base stations BS1, BS2 are shown in FIG. 1 by way of example. Associated with the mobile switching centers of the subnetworks MN1 and MN2 are home location registers (HLR) and visitor location registers (VLR), of which two home location registers HLR1, HLR2 are shown in FIG. 1 by way of example. These location registers (databases) are connected to the mobile switching centers via the signaling networks of the subnetworks MN1 and MN2.

Of the mobile terminals registered in the subnetworks MN1 and MN2, only two terminals MTE1, MTE2 are shown in FIG. 1. They are both associated with subscriber A and are in the radio coverage areas of the base stations BS1 and BS2, respectively.

The mobile switching centers GMSC1 and GMSC2 represent gateway switching centers which additionally provide interworking functions (see above) for the interface from the subnetwork FN1 to the subnetworks MN1 and MN2, respectively. These interworking functions could also be provided by a specific signaling node.

The mobile switching centers GMSC1 and GMSC2 are connected to the signaling node GTW of the subnetwork FN1 and, together with this signaling node, provide gateways from the signaling network of the subnetwork FN1 to the subnetworks MN1 and MN2, respectively.

Subscriber A has three terminals TE1, MTE1, and MTE2 under which he is registered in the communications network KOM. He may have further terminals that are registered in the communications network KOM.

In the respective subnetwork, each of these terminals is assigned at least one number. These numbers are geographic numbers, but they may also be personal numbers (e.g., prefix 07100). The service control point SCP assigns to subscriber A a subscriber number at which the subscriber can be reached irrespective of which of the terminals TE2, MTE1, and MTE2 is then used by the subscriber to answer the call. The numbers of the terminals registered for subscriber A in the communications network KOM thus represent internal network numbers that are hidden from the calling subscribers by the service control point SCP. It is also possible, of course, to use one of the numbers of the terminals TE2, MTE1, or MTE2 as the subscriber number.

To establish a call through the communications network KOM to subscriber A, subscriber B dials the subscriber number of subscriber A. The service switching point SSP1 recognizes by the subscriber number that the call initiated by subscriber A is directed to a subscriber having at least one fixed terminal and at least one mobile terminal registered in the communications network KOM. When the service switching point SSP1 detects such a call, it sends a service request message to the service control point SCP, whereby the service control point SCP is triggered for this call.

After being triggered for a call in this way, the service control point SCP determines the subscriber to whom the call is directed, here the subscriber A. Then, by exchanging signaling messages, it requests from the mobile radio networks of the communications network KOM in which mobile terminals associated with the subscriber are registered status data about the mobile terminals associated with the subscriber. Thus, by exchanging signaling messages via the signaling node GTW and the mobile switching centers GMSC1 and GMSC2, the service control point SCP requests status data of the terminals MTE1 and MTE2 from the mobile radio networks MN1 and MN2, respectively. Based on the status data so requested, the service control point SCP then selects that of the terminals TE2, MTE1, and MTE2 of subscriber A to which the call has to be routed. After that, the service control point SCP, by sending a corresponding control message to the service switching point SSP1, controls the routing of the call to the selected terminal by causing the service switching point SSP1 to enter the number of this terminal as the destination number of the call.

The configuration of the service control point SCP will now be explained in detail with reference to FIG. 2.

Figure 2:
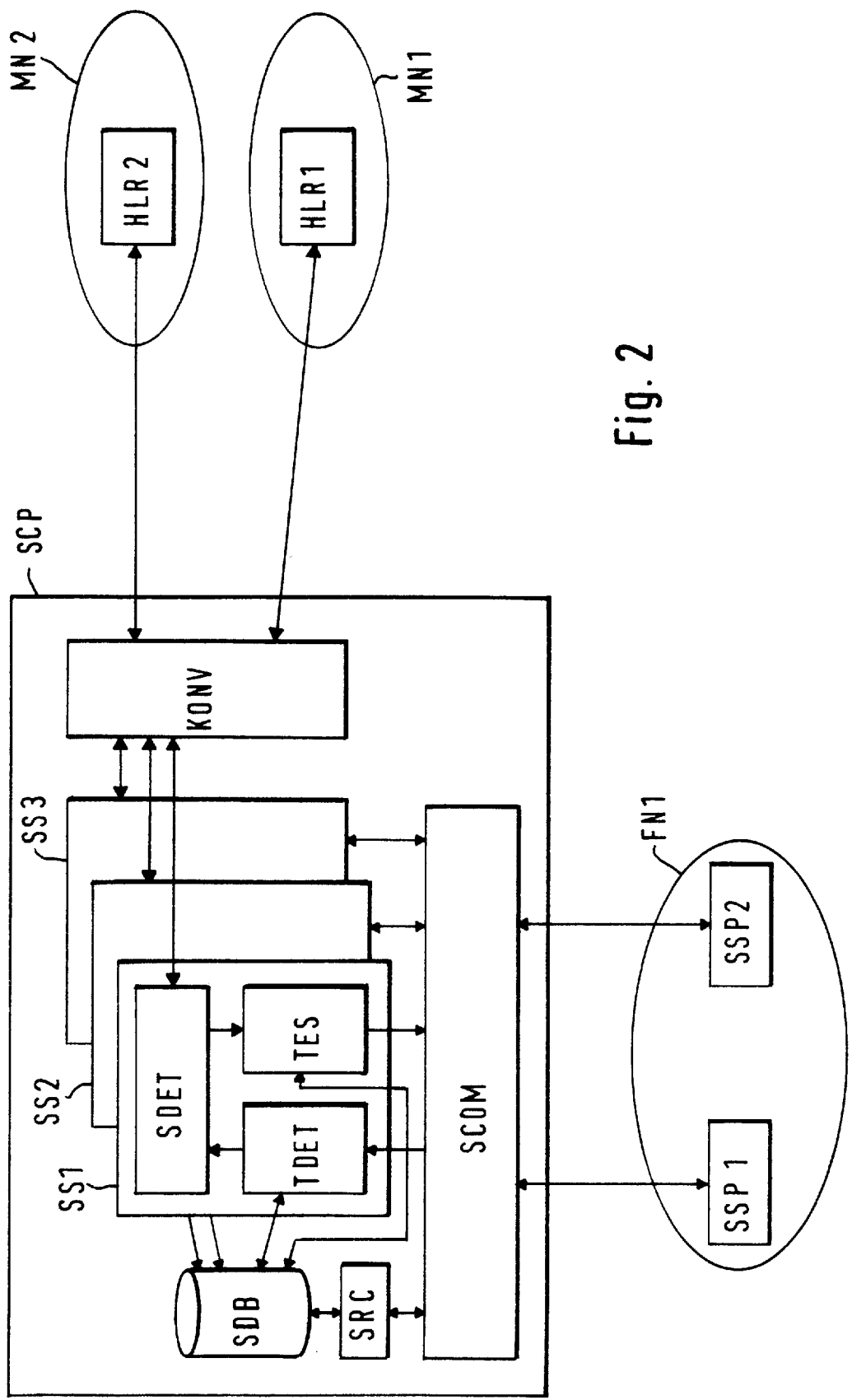
FIG. 2 is a functional diagram of the service control point of FIG. 1.

FIG. 2 shows the service control point SCP, the subnetwork FN1 with the service switching points SSP1 and SSP2, and the subnetwork MN1 and MN2 with the home location registers HLR1 and HLR2.

The service control point SCP is formed by a system platform with one or more interconnected computers and peripheral components on which application programs for performing functions of the service control point SCP are executed. From a functional point of view, the service control point SCP contains three control units SCOM, KONV, and SRC, three service processes SS1 to SS3, and a database SDB.

The control unit SCOM, on the one hand, provides the hardware and software functions for the communication with the service switching functions of the service switching points SSP1 and SSP2 and with the service switching functions of the further service switching points of the subnetwork FN1. It processes the No. 7 transport protocols governing the communication over the signaling network and the higher-level protocol layers that are provided for the communication between service control functions and service switching functions in accordance with the IN architecture. These are in particular the TCAP protocol (TCAP= Transaction Capabilities Application Part) and the INAP protocol (INAP=Intelligent Network Application Part).

It is also possible to use a computer network, such as a local area network (LAN), for the communication between the service control point SCP and the service switching points SSP1 and SSP2, in which case the transport protocols corresponding to such a computer network are processed by the control unit SCONTR. The INAP protocol could also be replaced by the MAP protocol (MAP=Mobile Application Part).

On the other hand, the control unit SCOM manages the service processes, assigns messages arriving at the service control point to service processes, and is responsible for the generation of service processes: When the service control point is triggered for a call by the reception of a service request message, the control unit generates a service process. The service process then controls the service provision for this call. When the service provision has been completed, the service process is erased. As shown in FIG. 2, three service processes SS1 to SS3 are currently being performed in parallel by the service control point SCP, i.e., the service control point SCP has been triggered for three calls.

The database SDB contains data that assign subscriber numbers to terminal numbers of the subnetworks FN1, MN1, and MN2: Each subscriber number is assigned the numbers of those terminals of the communications network KOM which are registered in the communications network KOM for the subscriber who is identified by the subscriber number. In addition, the subscriber number is assigned further data which are used as selection parameters in the procedure for selecting the terminal number to which a call is directed. These data determine a personal selection profile for each subscriber.

It is also possible to assign to a subscriber in the database SDB two or more different functional subscriber numbers relating to different functions of the subscriber. A subscriber number would thus refer to, e.g., a subscriber who, in turn, has been assigned terminal numbers and selection parameters.

The control unit SRC manages the implementation of changes in the data of the database SDB. Such changes (selection parameters, assigned terminal numbers) can be made by subscribers themselves, who can thus determine and change their personal selection profiles in particular. Communication between the subscriber and the control unit SRC is activated by dialing a particular service number which activates the control unit SRC for the respective call.

The operation of the service processes SS1 to SS3 will now be described using the service process SS1 as an example.

The service process SS1 has three functions TDET, SDET, and TES.

The function TDET receives from the control unit SCOM the destination subscriber number of the call for which the control unit SCP has been triggered, and, by accessing the database SDB, determines the numbers of those terminals of the communications network KOM which are registered in the communications network KOM for the subscriber specified by this subscriber number.

The function SDET determines which of these terminal numbers are assigned to mobile terminals. Then, by accessing the control unit CONV, it requests current status data about these mobile terminals from the respective mobile radio networks in which the mobile terminals are registered. Requested status data are, for example: mobile terminals activated/deactivated, call forwarding activated, location of the mobile terminal.

By means of these requested status data and by accessing the selection parameters assigned to the subscriber number, the function TES then selects that of the terminal numbers determined for the subscriber number to which the call for which the service process SS1 was initiated has to be routed. Selection criteria may be, for example: priority list for terminals, mobile terminal activated/not activated, location areas of the mobile terminals relative to each other or to fixed-network/cordless terminals.

The control unit KONV requests the status data by exchanging signaling messages, such as MAP messages, with the respective mobile radio networks. To request the status data, the control unit KONV may send a message to that home location register of the respective mobile radio network which contains the subscriber record of the respective mobile terminal. By means of this message, it then requests this database to send the corresponding status data to the service control point SCP. Corresponding signaling messages for status inquiry may also be sent directly to mobile switching centers.

The control unit KONV advantageously makes available to the service processes SS1 to SS3 a converter function which converts IN messages to a GSM mechanism for status inquiry. The converter function supports, for example, an INAP/MAP protocol conversion for the status inquiry procedure. Thus, the service processes require no knowledge of the procedures and protocols for status inquiry; their complexity is substantially reduced.

The message flow during the implementation of a method according to the invention will now be explained by way of example with reference to FIG. 3.

Figure 3:
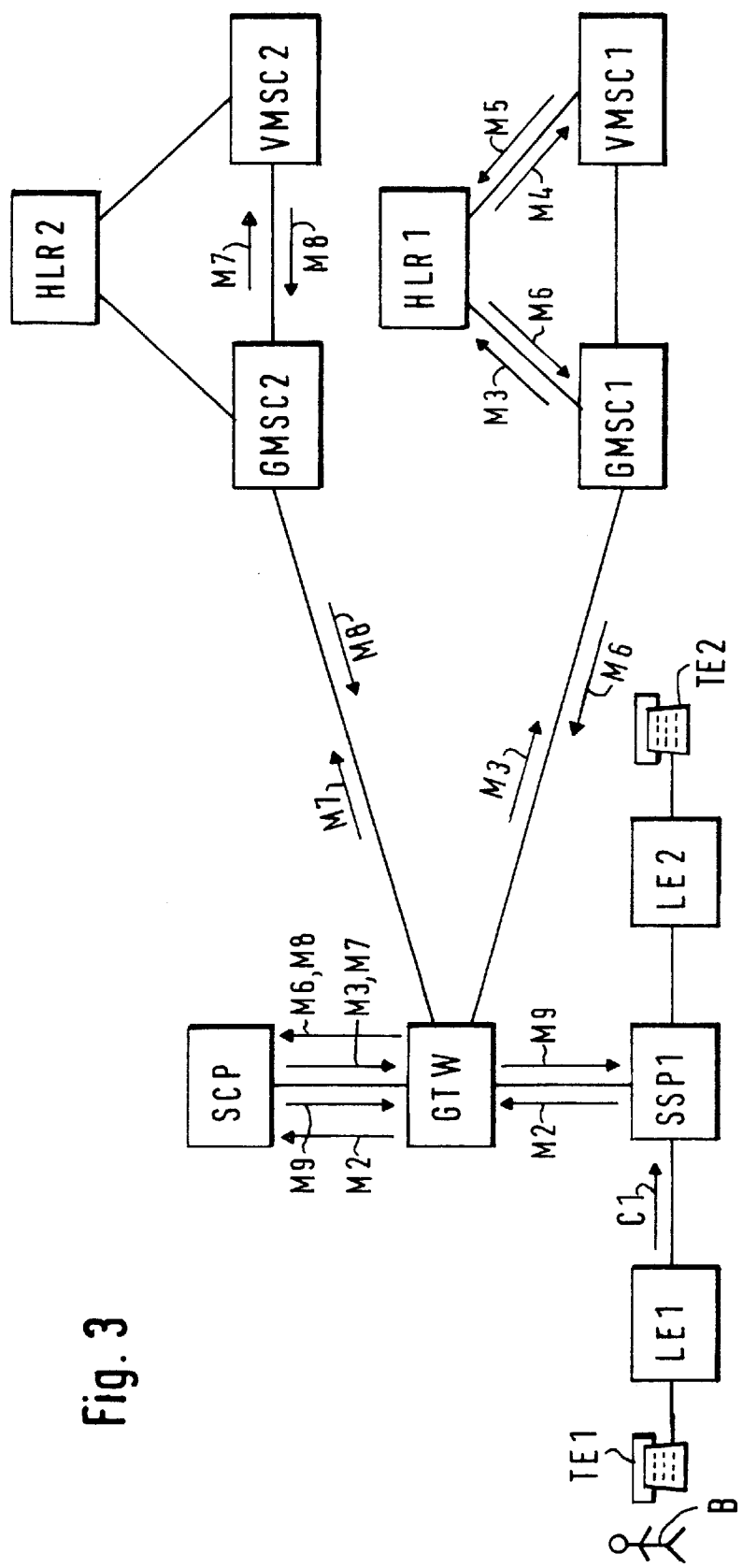
FIG. 3 shows the message flow in the communications network of FIG. 1 during the implementation of the methods according to the invention.

FIG. 3 shows the exchanges LE1, LE2, and SSP1, the mobile switching centers GMSC1, GMSC2, VMSC1, and VMSC2, the signaling node GTW, the service control point SCP, the home location registers HLR1 and HLR2, a call C1, and eight messages M2 to M9.

The exchange SSP1 recognizes that the call C1, which is directed to subscriber A, contains a destination subscriber number assigned to several terminal numbers, and sends a service request message, the message M2, via the signaling node GTW to the service control point SCP. The control unit KONV then sends request messages, the messages M3 and M7, to the subnetworks MN1 and MN2. The messages M3 and M7 may be transmitted in parallel or serially.

The message M3 is routed through the signaling node GTW and the mobile switching center GMSC1 to the home location register HLR1. The status inquiry process initiated in the home location register HLR1 determines the requested status information by interrogating the mobile switching center VMSC1, in whose area the terminal MTE1 currently is, for status data about the terminal MTE1 by means of the message M4. These requested data are received by the status inquiry process with the message M5, and are sent in a reply message, the message M6, via the mobile switching center GMSC1 and the signaling node GTW to the service control point SCP.

The message M7 is routed through the signaling node GTW and the mobile switching center GMSC2 to the mobile switching center VMSC2, which represents that mobile switching center of the subnetwork MN2 in whose area the terminal MTE2 currently is. The message M7 starts a status inquiry process at the mobile switching center GMSC2. The data determined by the status inquiry process are then sent with the message M8 via the mobile switching center GMSC2 and the signaling node GTW to the service control point SCP.

Based on the received status data about the terminals MTE1 and MTE2, the function TES then determines that terminal of the subscriber A to which the call C1 is directed, and controls by means of the message M9, which is routed through the signaling node GTW to the service switching point SSP1, that the call C1 is forwarded to this terminal.

What is claimed is:

1. A method of providing a personal communications service to subscribers (A) having at least one fixed terminal 1. (TE2) and at least one mobile terminal (MTE1, MTE2) registered in a communications network (KOM) consisting of two or more fixed networks (FN1) and mobile radio networks (MN1, MN2), in which method a service control point (SCP) is triggered by a service switching point (SSP1) when the service switching point (SSP1) detects a call (C1) directed to such a subscriber, and controls the routing of the call (C1) through the service switching point (SSP1) to one of the subscriber's registered terminals which was selected by the service control point (SCP), characterized in that, when being triggered for a call (C1) directed to a particular subscriber (A) by the reception of a service request message (M2), the service control point (SCP), by exchanging signaling messages (M3 to M8), requests status data about the at least one mobile terminal (MTE1, MTE2) associated with the particular subscriber (A) from the respective radio network (MN1, MN2) in which the respective at least one mobile terminal associated with the particular subscriber (A) is registered, and that by means of the respective status data, the service control point (SCP) selects that terminal of the particular subscriber (A) to which the call (C1) for which the service control point (SCP) has been triggered is to be routed.

2. A method as claimed in claim 1, characterized in that the service control point (SCP) requests status data about the at least one mobile terminal (MTE1, MTE2) associated with the particular subscriber by exchanging MAP messages.

3. A method as claimed in claim 2, characterized in that in order to request the status data, an MAP message (M3) is sent to that home location register of the respective mobile radio network (MN1) in which the subscriber record of the respective at least one mobile terminal (MTE1) of the particular subscriber (A) is stored.

4. A method as claimed in claim 1, characterized in that the service control point (SCP) requests the status data by means of a converter (KONV) which converts IN messages to a GSM mechanism for status inquiry.

5. A method as claimed in claim 4, characterized in that the converter (KONV) performs an INAP/MAP protocol conversion.

6. A method as claimed in claim 1, characterized in that in order to forward the call (C1), the service control point (SCP) translates the particular subscriber's (A) destination number contained in the call to one of the internal-network numbers of the particular subscriber's (A) terminals (TE2, MTE1, MTE2) registered in the communications network (KOM).

7. A method as claimed in claim 1, characterized in that the service control point assigns to a subscriber several different functional subscriber numbers relating to different functions of the subscriber, and that the selection is made based on the functional subscriber number contained in the call and on the requested status data of the at least one mobile terminal associated with the subscriber.

8. A method as claimed in claim 1, characterized in that if the particular subscriber has a mobile terminal registered in different mobile radio networks, the service control point requests status data for said terminal from said different mobile radio networks by exchanging signaling messages.

9. A method of routing a call (C1) directed to a subscriber (A) having at least one fixed terminal (TE2) and at least one mobile terminal (MTE1, MTE2) registered in a communications network (KOM) consisting of two or more fixed networks (FN1) and mobile radio networks (MN1, MN2), in which method a service switching point (SSP1) triggers a service control point (SCP) when the service switching point (SSP1) detects a call directed to the subscriber (A), and in which the service control point (SCP) controls the routing of the call (C1) through the service switching point (SSP1) to one of the subscriber's registered terminals (TE2, MTE1, MTE2) which was selected by the service control point (SCP), characterized in that, when being triggered for the call (C1) directed to the subscriber by the reception of a service request message (M2), the service control point (SCP), by exchanging signaling messages (M3 to M8), requests status data about the at least one mobile terminal (MTE1, MTE2) associated with the subscriber from the respective mobile radio network (MN1, MN2) in which the at least one mobile terminal associated with the subscriber is registered, and that by means of the requested status data, the service control point (SCP) selects that terminal of the subscriber (A) to which the call (C1) is to be routed.

10. A service control point (SCP) for providing a personal communications service to subscribers (A) having at least one fixed terminal (TE2) and at least one mobile terminal (MTE1, MTE2) registered in a communications network (KOM) consisting of two or more fixed networks (FN1) and mobile radio networks (MN1, MN2), the service control point (SCP) being designed in such a way that, when triggered by a service switching point (SSP1, SSP2) for a call (C1) directed to such a subscriber, it controls the routing of the call (C1) through the service switching point (SSP1, SSP2) to a selected one of the subscriber's registered terminals (TE2, MTE1, MTE2), characterized in that the service control point (SCP) is further designed in such a way that, when being triggered for a call (C1) directed to a particular subscriber (A) by the reception of a service request message (M2), the service control point (SCP), by exchanging signaling messages (M3 to M8), requests status data about the at least one mobile terminal (MTE1, MTE2) associated with the particular subscriber (A) from the respective mobile radio network (MN1, MN2) in which the at least one mobile terminal (MTE1, MTE2) associated with the particular subscriber is registered, and that the service control point (SCP) is further designed to select, by means of the requested status data, that terminal of the particular subscriber (A) to which the call (C1) for which it has been triggered is to be routed.

* * * * *